(12) United States Patent
Yamashita et al.

(10) Patent No.: US 8,208,785 B2
(45) Date of Patent: Jun. 26, 2012

(54) VIDEO RECORDING SYSTEM, VIDEO CAMERA, VIDEO RECORDING APPARATUS, METHOD OF CONTROLLING VIDEO RECORDING APPARATUS BY VIDEO CAMERA, AND METHOD OF RECORDING VIDEO SIGNAL IN VIDEO RECORDING

(75) Inventors: Jin Yamashita, Kanagawa (JP); Tadashi Fujiwara, Kanagawa (JP); Hirofumi Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1366 days.

(21) Appl. No.: 11/375,832

(22) Filed: Mar. 15, 2006

(65) Prior Publication Data

US 2006/0210254 A1  Sep. 21, 2006

(30) Foreign Application Priority Data

Mar. 17, 2005  (JP) ................. 2005-077965

(51) Int. Cl.
*H04N 5/77* (2006.01)
*H04N 5/76* (2006.01)
*H04N 5/78* (2006.01)
*H04N 5/225* (2006.01)
*H04N 7/12* (2006.01)
*H04N 7/173* (2006.01)
*H04N 11/00* (2006.01)
*H04L 12/56* (2006.01)
*G06F 3/12* (2006.01)
*G06K 9/36* (2006.01)
*G11B 5/02* (2006.01)
*G11B 5/09* (2006.01)
*G11B 20/14* (2006.01)

(52) U.S. Cl. ........ 386/224; 386/235; 386/324; 386/341; 386/360; 348/207.1; 348/207.11; 348/207.99; 348/468; 358/1.15; 360/18; 360/27; 360/40; 360/48; 370/394; 375/240.01; 375/240.1; 382/232; 725/87

(58) Field of Classification Search .................. 386/117, 386/E9.013, 95, E5.072, 235, 341, 360, E5.069; 348/207.1, 207.11, 207.99, 468, 910, E5.007, 348/E5.042, E7.034, E7.063, E7.073, E5.061; 360/40, 48, 18, 27; 375/240.1, E7.014, E7.022, 375/E7.025, 240.01, E7.272; 382/232; 358/906, 358/1.15; 725/87; 340/693.5, 541; 370/394
See application file for complete search history.

(56) References Cited

U.S. PATENT DOCUMENTS 4,999,706 A * 3/1991 Kinghorn ..................... 348/468
(Continued)

FOREIGN PATENT DOCUMENTS

EP  1 298 663  4/2003
(Continued)

*Primary Examiner* — Thai Tran
*Assistant Examiner* — Syed Hasan
(74) *Attorney, Agent, or Firm* — Frommer Lawrence & Haug LLP; William S. Frommer; Thomas F. Presson

(57) ABSTRACT

A video recording system is provided in which reliability of information supplied from a video camera to control recording and the like is improved when video being obtained by a video camera is recorded in one or more VTRs. In the video recording system, the video camera multiplexes: control information to control the VTR in accordance with an operational status of an operation unit of the video camera and a video signal from an imaging unit of the video camera, and transmits the result to the VTR as a transmission serial digital signal. The VTR separates the video signal and the control information from the serial digital signal and controls a video recording system of the VTR based on the control information.

18 Claims, 13 Drawing Sheets

U.S. PATENT DOCUMENTS

| | | | |
|---|---|---|---|
| 5,469,308 A | | 11/1995 | Hamoda et al. |
| 5,579,183 A | * | 11/1996 | Van Gestel et al. .............. 360/48 |
| 5,684,919 A | * | 11/1997 | Kikuzawa et al. ............ 386/227 |
| 6,434,323 B1 | | 8/2002 | Hayashi |
| 7,336,300 B2 | * | 2/2008 | Hirasawa ................. 348/207.99 |
| 7,492,821 B2 | * | 2/2009 | Berman et al. ............. 375/240.1 |
| 2002/0041390 A1 | * | 4/2002 | Mizuno et al. ............... 358/1.15 |
| 2002/0100052 A1 | * | 7/2002 | Daniels ........................... 725/87 |
| 2003/0058866 A1 | * | 3/2003 | Kitayama .................... 370/394 |
| 2003/0185302 A1 | | 10/2003 | Abrams, Jr. |
| 2004/0252231 A1 | | 12/2004 | Agnoli et al. |
| 2005/0002648 A1 | | 1/2005 | Hoshino et al. |
| 2005/0200494 A1 | * | 9/2005 | Herrmann et al. ......... 340/693.5 |
| 2006/0171667 A1 | * | 8/2006 | Murski et al. ................... 386/83 |
| 2006/0176951 A1 | * | 8/2006 | Berman et al. ........... 375/240.01 |

FOREIGN PATENT DOCUMENTS

| | | | |
|---|---|---|---|
| EP | 1 445 944 | | 8/2004 |
| JP | 5 292447 | | 11/1993 |
| JP | 7 203265 | | 8/1995 |
| JP | 11112919 A | * | 4/1999 |
| JP | 2001 218175 | | 8/2001 |
| JP | 2002 25224 | | 1/2002 |
| JP | 2002 157824 | | 5/2002 |
| JP | 2003 153054 | | 5/2003 |

* cited by examiner

FIG. 5

| Parameter | Value |
|---|---|
| Line No. | 9 or 571 |
| DID | 52h |
| SDID | 4Dh |
| DC | 0Bh |
| UDW0~8 | Same as Audio Control Packet |
| UDW9 | CMD0 |
| UDW10 | CMD1 |

UDW9, UDW10 → VTR Control Command

FIG. 6

|  | CMD0 | CMD1 |
|---|---|---|
| STOP | 20 | 00 |
| PLAY | 20 | 01 |
| REC | 20 | 02 |
| F.FWDx5 | 20 | 03 |
| REWx5 | 21 | 03 |
| EJECT | 20 | 0F |

FIG. 7

| Parameter | Value | Definition |
|---|---|---|
| ADF | 00h | Ancillary Data Flag |
| | FFh | |
| | FFh | |
| DID | 52h | Data ID |
| SDID | 4Dh | Secondary Data ID |
| DC | 0Bh | Data Count |
| AF | —— | Audio Frame Number Data |
| RATE | —— | Sampling Frequency Data |
| ACT | —— | Active Channel Data |
| DEL5-6 | —— | CH5, 6 Audio Delay Information Data |
| DEL7-8 | —— | CH7, 8 Audio Delay Information Data |
| CMD0 | —— | VTR Control command |
| CMD1 | —— | |
| CS | —— | Checksum |

FIG. 8

| Parameter | Value |
|---|---|
| Line No. | 9 or 571 |
| DID | 52h |
| SDID | 4Eh |
| DC | (Not Fixed) |
| UDW0~ | VTRID and VTR Control command |

FIG. 9

| Parameter | Value | Definition |
|---|---|---|
| ADF | 00h | Ancillary Data Flag |
| | FFh | |
| | FFh | |
| DID | 52h | Data ID |
| SDID | 4Eh | Secondary Data ID |
| DC | 03h | Data Count |
| VTR ID | 00h | Designated VTRID Number (00h Designates All VTRS) |
| CMD0 | — | VTR Control command |
| CMD1 | — | |

FIG. 10

| Parameter | Value | Definition |
|---|---|---|
| ADF | 00h | Ancillary Data Flag |
| | FFh | |
| | FFh | |
| DID | 52h | Data ID |
| SDID | 4Eh | Secondary Data ID |
| DC | 0Ch | Data Count |
| VTR ID | 01h | Designated VTRID Number |
| CMD0 | — | VTR Control command |
| CMD1 | — | |
| VTR ID | 03h | Designated VTRID Number |
| CMD0 | — | VTR Control command |
| CMD1 | — | |
| CS | — | Checksum |

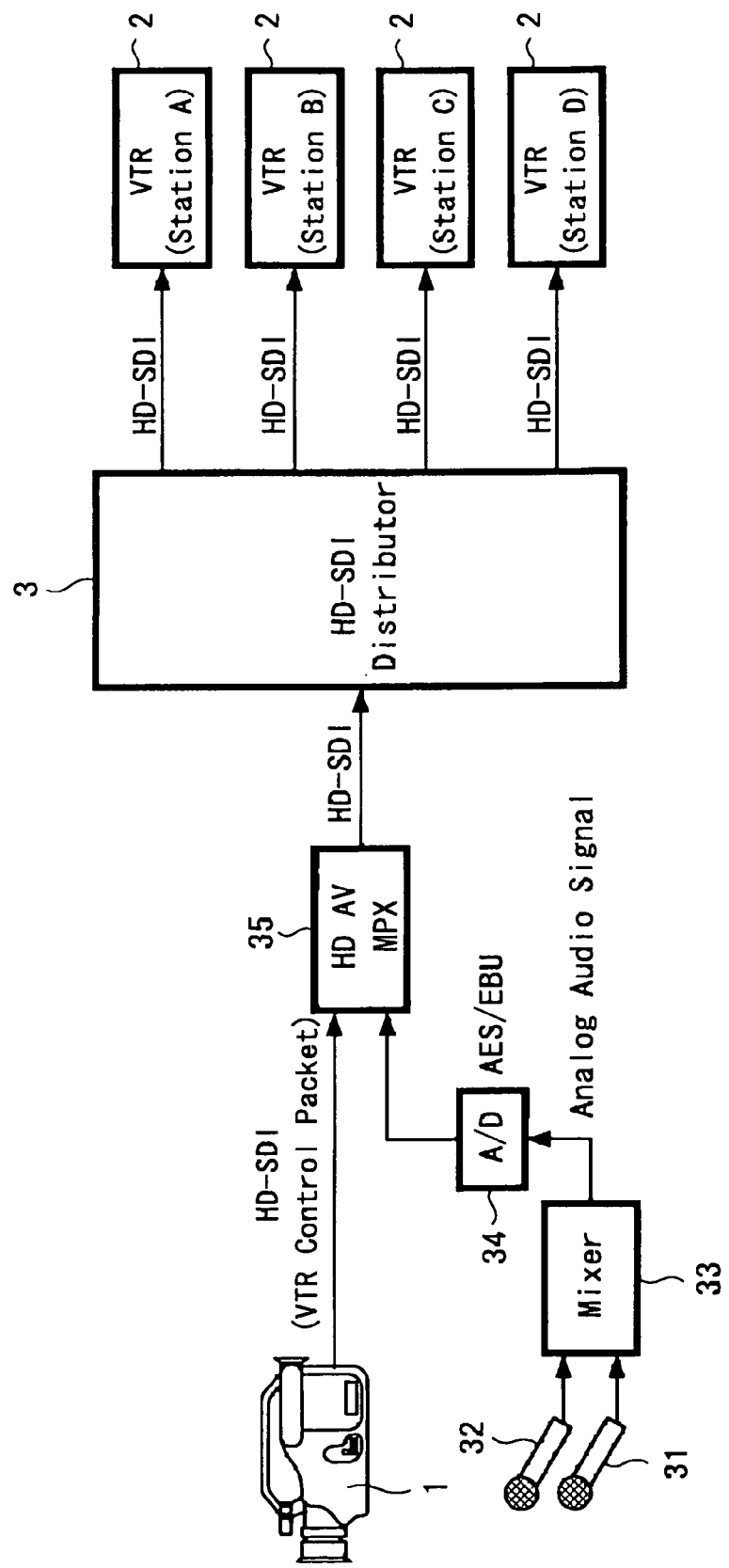

VIDEO RECORDING SYSTEM, VIDEO CAMERA, VIDEO RECORDING APPARATUS, METHOD OF CONTROLLING VIDEO RECORDING APPARATUS BY VIDEO CAMERA, AND METHOD OF RECORDING VIDEO SIGNAL IN VIDEO RECORDING

CROSS REFERENCES TO RELATED APPLICATIONS

The present invention contains subject matter related to Japanese Patent Application JP 2005-077965 filed in the Japanese Patent Office on Mar. 17, 2005, the entire contents of which being incorporated herein by reference.

BACKGROUND OF THE INVENTION

1. Field of the Invention:

The present invention relates to a video recording system including a video camera and a video recording apparatus remotely controlled by the video camera, and particularly to the system in which a malfunction of the video recording apparatus is prevented.

2. Description of the Related Art:

In the case where a plurality of broadcasting stations have coverage on the same scene, there is one mode of the coverage called "pool coverage". This is such a mode that one broadcasting station among the plurality of broadcasting stations is appointed as a managing station, a camera operator of the managing station brings a video camera into the scene of coverage and the other broadcasting stations prepare VTRs, so that video obtained and recorded with the video camera by the camera operator of the managing station is also distributed and recorded in each VTR of the other broadcasting stations. The pool coverage is performed in the scene where a space to set equipment for coverage is restricted such as in a baseball stadium, for example.

FIG. 1 is a diagram showing a configuration of a system in related art to perform the pool coverage. A video camera 51 is a video camera incorporating a VTR and having a 26-pin connector (a kind of multi-connector) 51a, which is brought into the scene of coverage by a camera operator of a managing station.

The 26-pin connector 51a of the video camera 51 is connected to one of a plurality of 26-pin connectors 54a of a distributor 54 by using a 26-pin connector cable 53.

Each of VTRs 52 has a 26-pin connector 52a, and is prepared by each broadcasting station (A through D stations) other than the managing station. The 26-pin connector 52a of each VTR 52 is also connected to each of the plurality of 26-pin connectors 54a of the distributor 54 by using the 26-pin connector cable 53, respectively.

The distributor 54 has a function of distributing an analog composite signal and analog audio signal input into one 26-pin connector 54a assigned for the camera input among the plurality of 26-pin connectors 54a and outputting the signals from the remaining 26-pin connectors 54a assigned for the VTRs. Further, the distributor 54 is configured to have a plurality of tally lamps 54b each having a one-to-one correspondence with 26-pin connector 54a.

At the time of coverage, when the camera operator of the managing station performs a recording operation with the video camera 51, a trigger pulse for the operation is supplied from the video camera 51 to each of the VTRs 52 through the distributor 54, and the analog composite signal and analog audio signal from the video camera 51 are supplied to each of the VTRs 52 through the distributor 54. After that, when the camera operator performs an operation to stop the recording with the video camera 51, a trigger pulse for the operation is supplied from the video camera 51 to each of the VTRs 52 through the distributor 54.

Each time the trigger pulse is supplied through the distributor 54, each VTR 52 performs a toggle operation to record/stop recording. Further, a tally signal is supplied from the VTR 52 under recording operation to the 26-pin connector 54a of the distributor 54, and the tally lamp 54b corresponding to the 26-pin connector 54a is lit.

On the other hand, as an output mode of a video signal, a SDI (Serial Data Interface) signal is known other than the analog composite signal. SDI is a standard of serial digital interface according to SMPTE (US Society of Motion Picture and Television Engineers), in which SD-SDI is defined as SMPTE259M and HD-SDI is defined as SMPTE292M. In addition, a format of ancillary data packet applicable to SDI is defined as SMPTE291M.

In the past, as a method of using the ancillary data packet in SDI, there has been proposed one in which control information for editing video to be transmitted as a SDI signal is set in the ancillary data packet and an editing apparatus performs an edit operation on the transmitted video based on the control information (for example, refer to Patent Reference 1).

[Patent Reference 1] Japanese Published Patent Application No. 2003-224808 (paragraphs 0027 through 0039, FIGS. 1 and 2)

SUMMARY OF THE INVENTION

However, the following problems (a) and (b), for example, are recognized in the pool coverage system in related art as shown in FIG. 1.

(a) In the case where noise is mixed in a signal transmitted through the cable 53, since the VTR 52 assumes the noise to be a trigger pulse from the video camera 51, recording start operation and recording stop operation of the VTR 52 may be reversed and so video being obtained is not recorded in the VTR 52. Hence, reliability of the system deteriorates due to a cause on the side that supplies to the VTR 52 control information (pulse) to record/stop recording. In this case, if the camera operator or another staff of the managing station checks the tally lamp 54b of the distributor 54, the VTR 52 not performing the recording can be found to correct the situation on the spot. However, work on the side of managing station increases if such checking is required.

(b) Since the 26-pin connector cable 53 has approximately 3 m to 5 m to be extended, it is necessary to provide each VTR 52 at a position close to the video camera 51. Due to this reason, when a space for setting equipment for coverage is small as the above-described space in a baseball stadium, it is difficult to work when replacing a video tape of each VTR 52 and the like, because all of the plurality of VTRs 52 need to be set in the narrow space.

On the other hand, the technology described in the above Patent Reference 1 is technology at a stage where video already recorded in a VTR as a material is edited, which is not the technology at a stage where video is recorded in a VTR at the scene of coverage.

In view of the problems heretofore described, the present invention is made to improve the reliability of control information to record/stop recording and the like that is supplied from a video camera, when video obtained with the video camera is recorded in a video recording apparatus such as a VTR.

An embodiment of the present invention is a video recording system including a video camera and at least one video recording apparatus, in which the video camera includes: control information generation means for generating control information to control the video recording apparatus at predetermined intervals in accordance with an operational status of an operation unit of the video camera and transmission data generation means for generating a transmission serial digital signal by multiplexing the control information and a video signal from an imaging unit of the video camera and the video camera transmits the serial digital signal to the video recording apparatus; and the video recording apparatus includes: separation means for separating the video signal and the control information from the serial digital signal and control means for controlling a video recording system of the video recording apparatus based on the control information.

In the video recording system, the control information to control the video recording apparatus is generated on the side of the video camera at predetermined intervals in accordance with the operational status of the operation unit, and the serial digital signal in which the control information and video signal are multiplexed is transmitted to the video recording apparatus.

Further, on the side of the video recording apparatus, the video signal and the control information are separated from the transmitted serial digital signal and the video recording system is controlled based on the separated control information.

In this video recording system, as described above, the control information to control the video recording apparatus in accordance with the operation of the video camera is regularly supplied as part of the serial digital signal from the video camera to the video recording apparatus. Hence, when video being obtained by the video camera is recorded in the video recording apparatus, reliability of the control information supplied from the video camera to the video recording apparatus can be enhanced.

Further, in the video recording system, it is preferable as an example that the control information generation means of the video camera generate the control information at intervals of either one field or one frame of the video signal. Hence, the control information to control the video recording apparatus can be supplied constantly to the video recording apparatus.

Further, in the video recording system, it is preferable as an example that the control information generation means of the video camera generate control information to record the video signal in the video recording system of the video recording apparatus in accordance with an operation performed to record the video signal in a video recording system (a VTR in a VTR-incorporated video camera, for example) attached to the video camera, and generate control information to stop the recording of the video signal in the video recording system of the video recording apparatus in accordance with an operation performed to stop the recording of the video signal in the video recording system attached to the video camera.

Accordingly, since the control information to perform the same operation as the recording/recording stop operation of the video recording system attached to the video camera is supplied to the video recording apparatus, the same video as the one recorded by the video camera can be recorded in the video recording apparatus.

Further, it is also preferable that the control information generation means of the video camera generate control information to track back a position where video has already been recorded in a recording medium loaded in the video recording system of the video recording apparatus in accordance with an operation (for example, an operation to rewind a video tape in the VTR-incorporated video camera) performed to track back a position where the video has already been recorded in a recording medium loaded in the video recording system attached to the video camera.

Hence, in the case where the video already recorded in the video camera is, for example, overwritten and erased, the same video recorded in the video recording apparatus can also be overwritten and erased.

Further, in the video recording system, it is preferable as an example that the control information generation means of the video camera further generate identification information to designate any of the video recording apparatuses, the transmission data generation means of the video camera multiplex the identification information with the control information, and the control means of each video recording apparatus control the video recording system based on the control information, only when the relevant video recording apparatus is designated based on the identification information separated along with the control information by the separation means.

Hence, in the case where a plurality of video recording apparatuses exist, only a part of the video recording apparatuses can be designated and controlled.

Furthermore, in the video recording system, it is preferable as an example that the video recording apparatus further includes memory means for storing video signals, and the control means of the video recording apparatus store the video signal in the memory means in the case where the control information to record the video signal in the video recording system is separated by the separation means and no unrecorded area remains in the recording medium loaded in the video recording system, and after that, the control means record the video signal stored in the memory means into the loaded recording medium in the case where a recording medium having an unrecorded area is loaded in the video recording system.

Hence, in the case where no unrecorded area remains in the recording medium (for example, no volume remains in the video tape of the VTR) on the side of the video recording apparatus while recording the video obtained by the video camera into the video recording apparatus, the video can be recorded into the video recording apparatus without interruption, because the video obtained after that by the video camera is recorded in the replacing recording medium with a time difference.

In addition, in the video recording system, it is preferable as an example that transmission data generation means of the video camera generate an SDI signal and set the control information into an ancillary data packet.

Next, a video camera according to an embodiment of the present invention includes: control information generation means for generating control information to control a video recording apparatus at predetermined intervals in accordance with an operational status of an operation unit and transmission data generation means for generating a transmission serial digital signal by multiplexing the control information and a video signal from an imaging unit, and outputs the serial digital signal.

The video camera is the one constituting the above-described video recording system according to an embodiment of the present invention, and reliability of the control information supplied to the video recording apparatus can be improved, when the video being obtained is recorded in the video recording apparatus.

Next, a video recording apparatus according to an embodiment of the present invention includes: separation means for separating a video signal and control information from a serial digital signal input, control means for controlling a video recording system based on the control information, and memory means for storing the video signal, in which the control means store the video signal in the memory means in the case where the control information to record the video signal in the video recording system is separated by the separation means and no unrecorded area remains in a recording medium loaded in the video recording system, and after that, the control means record the video signal stored in the memory means into the recording medium loaded in the case where a recording medium having an unrecorded area is loaded in the video recording system.

The video recording apparatus is the one constituting the above-described video recording system according to an embodiment of the present invention, in which video from the video camera can be recorded based on the control information having high reliability and even in the case where no unrecorded area remains in the recording medium during the recording of the video from the video camera, the video can be recorded without interruption, because the video transmitted after that from the video camera is recorded in the newly replaced recording medium with a time difference.

Next, a method of controlling a video recording apparatus by the video camera according to an embodiment of the present invention includes the steps of: generating control information to control the video recording apparatus at predetermined intervals in accordance with an operational status of the operation unit of the video camera; generating a transmission serial digital signal by multiplexing the control information and a video signal from the imaging unit of the video camera; and transmitting the serial digital signal to the video recording apparatus.

The control method is a control method performed by the video camera in order to be used in the above-described video recording system according to an embodiment of the present invention, and reliability of the control information supplied to the video recording apparatus can be improved, when the video being obtained is recorded in the video recording apparatus.

Next, a method of recording a video signal in the video recording apparatus according to an embodiment of the present invention includes: a first step of separating a video signal and control information from an input serial digital signal and a second step of controlling the video recording system based on the control information, and in the second step, the video signal is stored in different memory means in the case where the control information to record the video signal in the video recording system is separated in the first step and no unrecorded area remains in a recording medium loaded in the video recording system, and after that, the video signal stored in the memory means is recorded in a loaded recording medium in the case where the recording medium having an unrecorded area is loaded in the video recording system.

The recording method is a recording method performed by the video recording apparatus in order to be used in the above-described video recording system according to an embodiment of the present invention, and the video from the video camera can be recorded based on the control information having high reliability, and even in the case where no unrecorded area remains in a recording medium during the recording of the video from the video camera, the video can be recorded without interruption, because the video transmitted from the video camera after that is recorded in the newly replaced recording medium with a time difference.

According to the embodiments of the present invention, such effectiveness can be obtained that reliability of the control information supplied from the video camera to the video recording apparatus is improved, when the video being obtained by the video camera is recorded in the video recording apparatus.

BRIEF DESCRIPTION OF THE DRAWINGS

FIG. 5 is a table showing parameters and data supplied from a CPU in FIG. 3 in order to generate an "audio-control and VTR-control packet";

FIG. 6 is a table showing contents of a VTR control command;

FIG. 7 is a table showing a structure of an "audio-control and VTR-control packet";

FIG. 8 is a table showing parameters and data supplied from the CPU in FIG. 3 in order to generate an independent "VTR-control packet";

FIG. 9 is a table showing an example a structure of an independent "VTR-control packet";

FIG. 10 is a table showing an example a structure of an independent "VTR-control packet";

FIG. 16 is a diagram showing a modified example of a system in FIG. 2.

DESCRIPTION OF THE PREFERRED EMBODIMENTS

Hereinafter, an embodiment of the present invention is specifically explained using the accompanied drawings. In the followings, an example in which an embodiment of the present invention is applied to perform pool coverage is explained.

Figure 2:
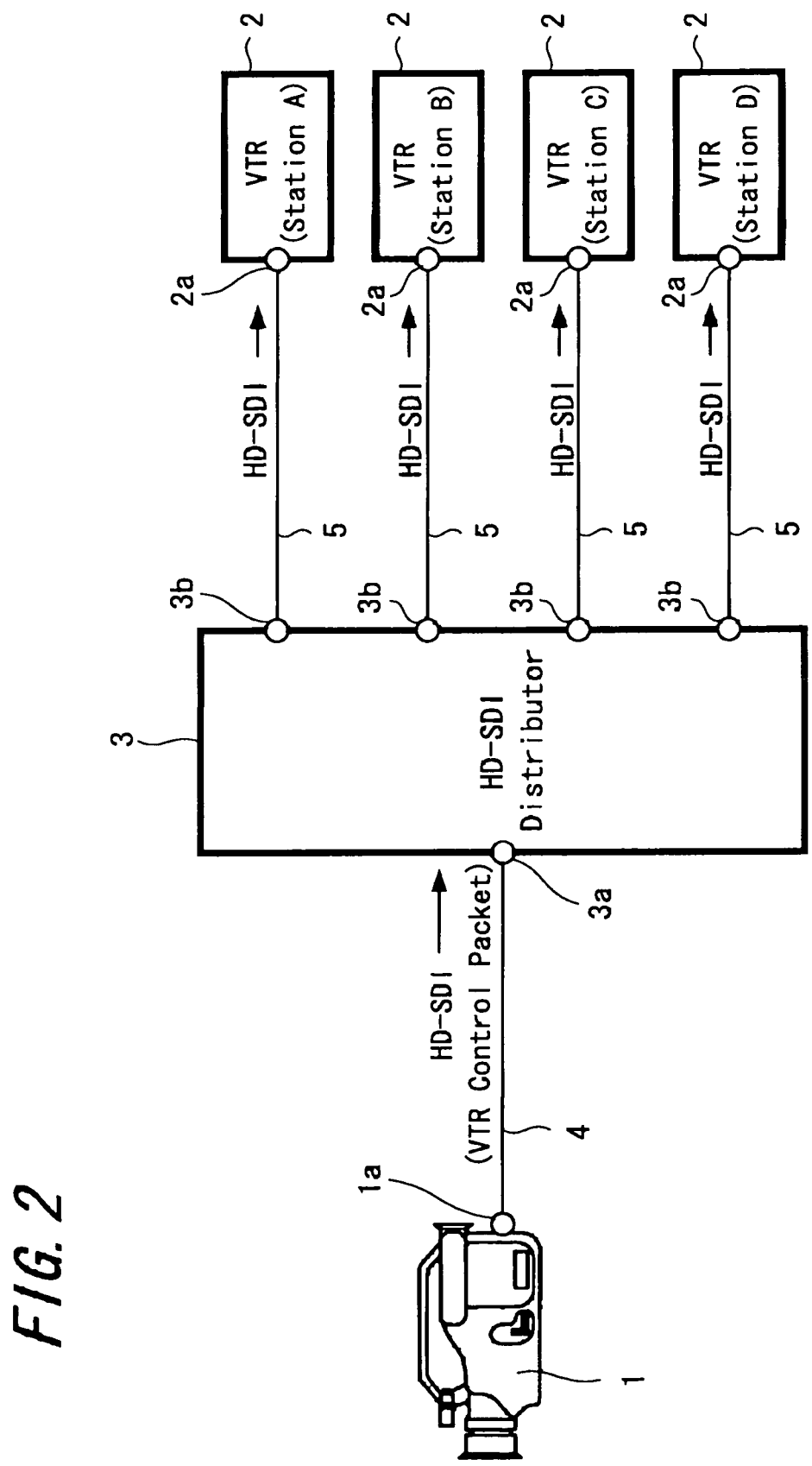
FIG. 2 is a diagram showing the whole configuration of a system for pool coverage to which an embodiment of the present invention is applied.

FIG. 2 is a diagram showing the whole configuration of a system for pool coverage to which an embodiment of the present invention is applied. A video camera 1 is a VTR-incorporated video camera which supports a digital HD and has a HD-SDI output terminal 1a and which is brought into the scene of coverage by a camera operator of a managing station.

The HD-SDI output terminal 1a of the video camera 1 is connected to a HD serial digital input terminal 3a of a HD-SDI distributor 3 using a BNC cable 4.

Each of VTRs 2 is a VTR having a HD serial digital input terminal 2a and is prepared by each of broadcasting stations A to D other than the managing station. The HD serial digital input terminal 2a of each VTR 2 is connected to one of a plurality of HD serial digital output terminals 3b in the HD-SDI distributor 3 using a BNC cable 5, respectively.

The HD-SDI distributor 3 incorporates an amplifier and PLL, and a signal input into the HD serial digital input terminal 3a is amplified and reclocked to be output from each of the HD serial digital output terminals 3b.

Since some BNC cable have 100 meters to be extended, each VTR 2 can be set not only at a position close to the video camera 1 but also at a position somewhat away from that.

Figure 3:
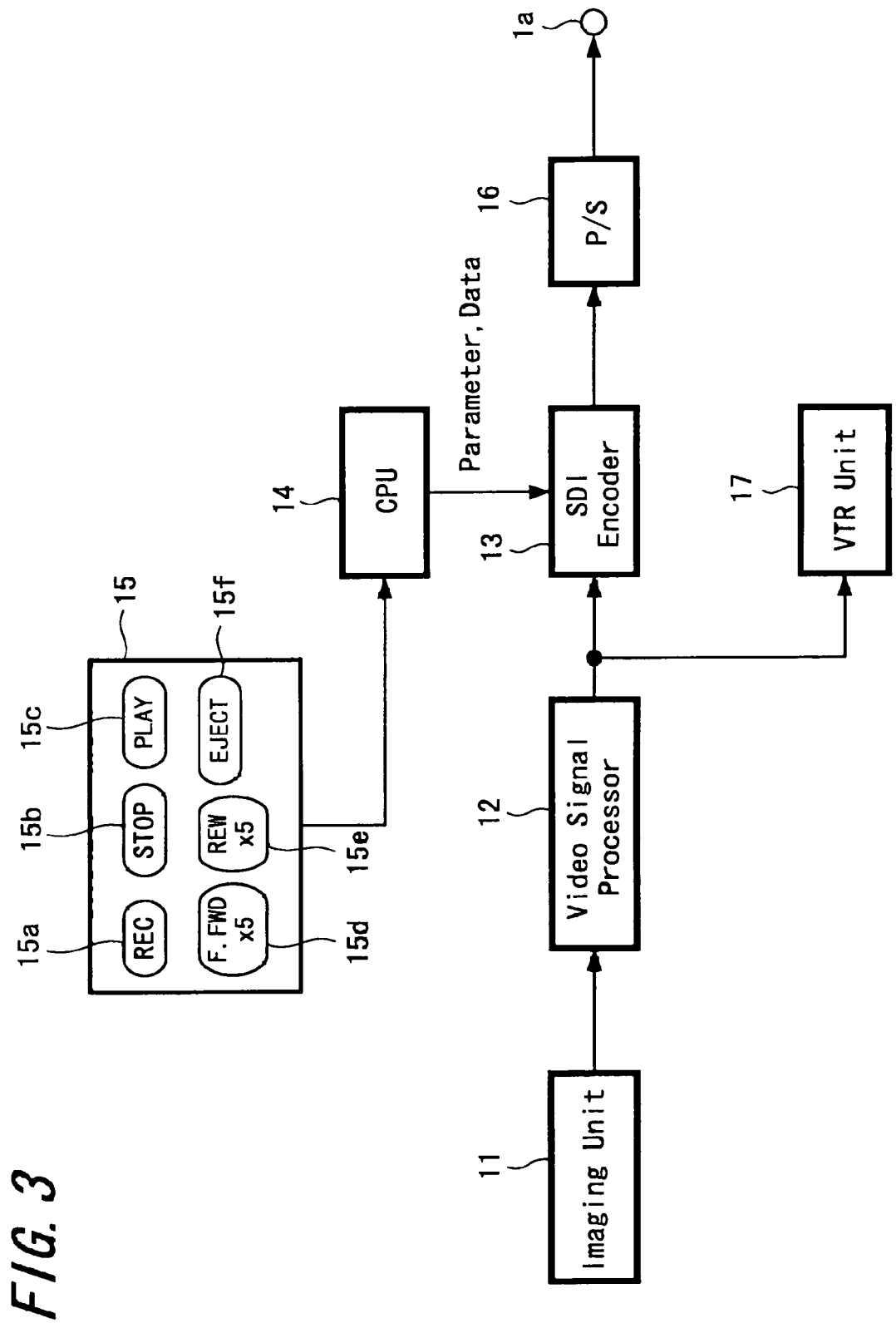
FIG. 3 is a block diagram showing a configuration of a main part of a video camera in FIG. 2.

FIG. 3 is a block diagram showing a configuration of a main part of the video camera 1. An imaging signal output from an imaging unit (CCD imager) 11 of the video camera 1 is sent to a video signal processor 12. The video signal processor 12 performs various signal processing (such as luminance signal processing, color signal processing, gamma correction and conversion into Y, Pb, Pr) and the like, after the imaging signal is digitally converted, to generate a digital HDTV signal. The digital HDTV signal is sent to a SDI encoder 13 and is also sent to a VTR unit (recording and reproducing system) 17 of the video camera 1 with a parallel system.

In addition, although not shown in the figure, an audio signal from a microphone attached to the video camera 1 is converted digitally and is sent to the VTR unit 17 and the SDI encoder 13 with a parallel system.

The SDI encoder 13 is a processor that performs format conversion on those digital HDTV signal and digital audio signal according to the definition of SMPTE292M (HD-SDI). Further, the SDI encoder 13 generates an ancillary data packet according to the definition of SMPTE291M under the control of a CPU 14 that controls each unit of the video camera 1, and the ancillary data packet is multiplexed with an ancillary data space of HD-SDI. Note that, hereinafter the ancillary data packet is described as an ANC packet.

SMPTE291M defines two kinds of ANC packets called type 1 and type 2. Type 1 uses only data ID (DID) of one word, and type 2 uses data ID of two words including DID and secondary ID (SDID).

There is a value assigned to DID in an ANC packet of each type such that a user can arbitrarily use it (User Application). As for type 2, range of the value is from 50h to 5Fh (h represents hexadecimal number).

Figure 4:
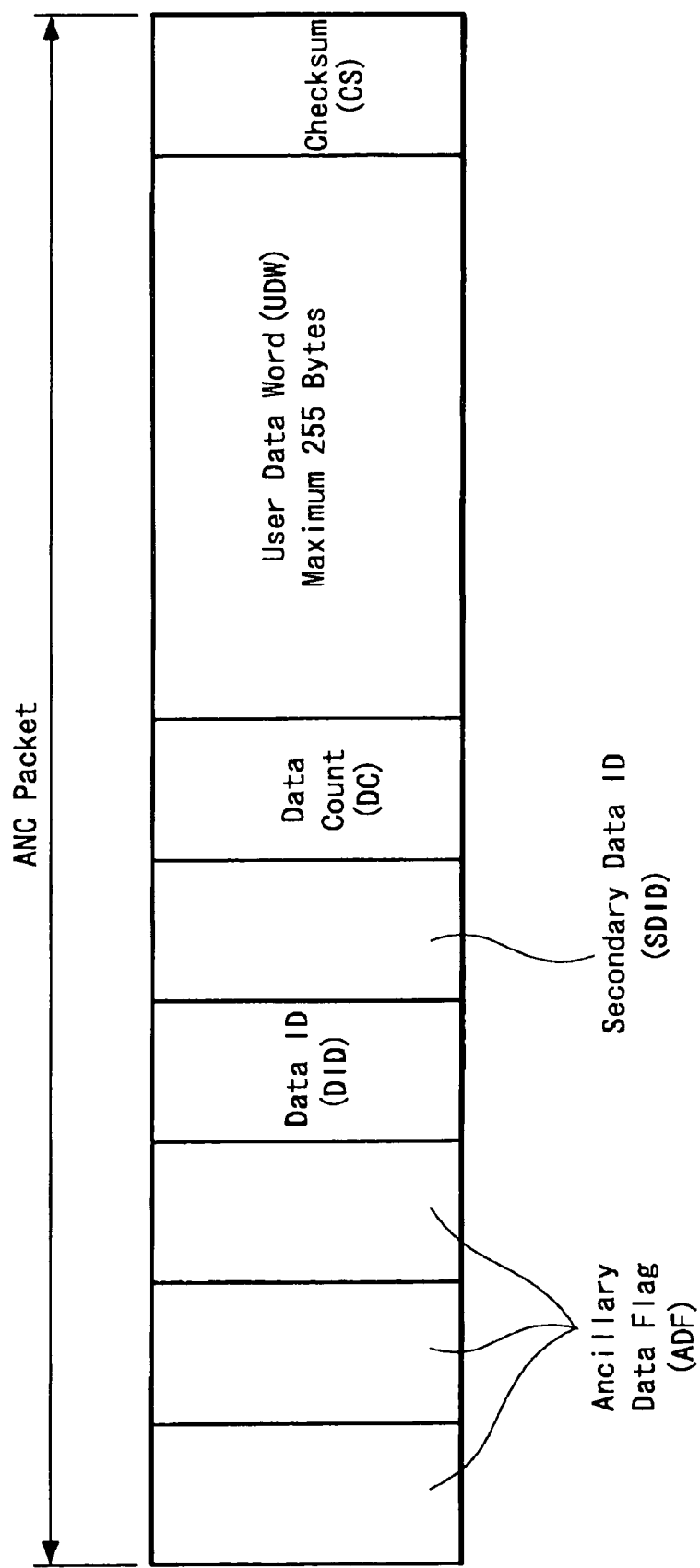
FIG. 4 is a diagram showing a format of an ANC packet of type 2.

FIG. 4 is a diagram showing a format of an ANC packet of type 2. The ANC packet of type 2 includes: an ancillary data flag (ADF) showing the start of ANC packet, data ID (DID), secondary data ID (SDID), data count (DC) showing a user data volume, user data word (UDW) of maximum 255 words, and checksum (CS).

The CPU 14 supplies to the SDI encoder 13 parameters (horizontal line number to multiplex an ANC packet, and values of DID, SDID, and DC of FIG. 4) and data (UDW of FIG. 4) to generate and multiplex the ANC packet of type 2.

In a video camera of the past that outputs a HD-SDI signal, an application as an audio control packet and as a metadata packet is typically assigned to an ANC packet. The present invention is characterized in that the CPU 14 supplies to the SDI encoder 13, not only such parameters and data for generating an audio control packet and a metadata packet, but also parameters and data for generating a "VTR control packet" to control each VTR 2 in FIG. 2 at intervals of one field of a digital HDTV signal.

As shown in FIG. 3, in accordance with contents of the present operation of REC (recording start) button 15a, STOP (recording stop) button 15b, PLAY (play video tape) button 15c, F. FWD×5 (×5 speed fast-forward of video tape) button 15d, REW×5 (×5 speed rewind of video tape) button 15e, and EJECT (ejection of video cassette) button 15f which are provided in an operation unit 15 to operate the VTR unit 17 of the video camera 1 itself, data (VTR control command) to control each VTR 2 to correspond with the operation are supplied to the SDI encoder 13 as the data (UDW in FIG. 4) to generate the "VTR control packet".

Hereupon, the number of ANC packets capable of being generated in the SDI encoder 13 is limited to a certain number or less (for example, five at maximum) depending on processing capacity and the like of a processor constituting the SDI encoder 13. Then, the CPU 14 makes one of ANC packets typically used as audio control packets (here, an audio control packet for CH5 through CH8 among two audio control packets for CH1 through CH4 and for CH5 through CH8) used as an "audio-control and VTR-control packet" that is an ANC packet serving also as a "VTR control packet".

FIG. 5 shows parameters and data supplied from the CPU 14 to the SDI encoder 13 in order to generate the "audio-control and VTR-control packet". As Line No. (a horizontal line number to multiplex an ANC packet in ancillary data space of HD-SDI), the 9th line is designated in the odd field and the 571st line is designated in the even field. As for DID, 52h that is the value within the range (50h through 5Fh) arbitrarily used by a user is designated. 4Dh is designated as SDID, and 0Bh is designated as DC.

As for UDW, UDW0 through UDW8 (1st word through 9th word) have the same contents as UDW of a typical audio control packet, and CMD0 that is a value of UDW9 (10th word) and CMD1 that is a value of UDW10 (11th word) are combined to obtain one VTR control command.

As described above, contents of the VTR control command (specific numerical values of CMD0 and CMD1) are determined by the operation of the buttons 15a through 15f of the operation unit 15 in FIG. 3. FIG. 6 is a table showing contents of the VTR control command with operation of each button of 15a through 15f corresponding thereto.

When the STOP button 15b is operated, the values of CMD0 and CMD1 become 20h and 00h respectively, and the VTR control command functions as a command (STOP command) to make each VTR 2 stop recording on a video tape.

When the PLAY button 15c is operated, the values of CMD0 and CMD1 become 20h and 01h respectively, and the VTR control command functions as a command (PLAY command) to make each VTR 2 play a video tape.

When REC button 15a is operated, the values of CMD0 and CMD1 become 20h and 02h respectively, and the VTR control command functions as a command (REC command) to make each VTR 2 perform recording on a video tape.

When the F. FWD×5 button 15d is operated, the values of CMD0 and CMD1 become 20h and 03h respectively, and the VTR control command functions as a command (F. FWD×5 command) to make each VTR 2 fast-forward a video tape at ×5 speed.

When the REW×5 button 15e is operated, the values of CMD0 and CMD1 become 21h and 03h respectively, and the VTR control command functions as a command (REW×5 command) to make each VTR 2 rewind a video tape at ×5 speed.

When the EJECT button 15f is operated, the values of CMD0 and CMD1 become 20h and 0Fh respectively, and the VTR control command functions as a command (EJECT command) to make each VTR 2 eject a video cassette.

The SDI encoder 13 generates and multiplexes the "audio-control and VTR-control packet" in which the VTR control command has been set based on the parameters and data from the CPU 14. FIG. 7 is a table showing a structure of the "audio-control and VTR-control packet" generated by the SDI encoder 13. UDW includes AF (audio frame number data), RATE (sampling frequency data), ACT (active channel data), DEL5-6 (CH5, 6 audio delay information data) and DEL7-8 (CH7, 8 audio delay information data) as data for audio control, and further includes the VTR control command (CMDO and CMD1). Since a specific numerical value of each data differs depending on contents of control, the value is not shown in FIG. 7.

Thus, the SDI encoder 13 generates the "audio-control and VTR-control packet" as one of the ANC packets at intervals of one field of the digital HDTV signal, and multiplexes the "audio-control and VTR-control packet" into the ancillary data space of HD-SDI.

However, as another example, in the case where there is a margin regarding the number of ANC packets that can be generated by the SDI encoder 13, a "VTR control packet" may be generated instead of the "audio-control and VTR-control packet" as an independent ANC packet separately from an audio control packet.

FIG. 8 is a table in which parameters and data supplied to the SDI encoder 13 from the CPU 14 are shown correspondingly to FIG. 5 in the case where a "VTR control packet" is generated as an independent ANC packet. Line No. and DID are the same as those shown in FIG. 5. 4Eh is designated as SDID.

UDW includes one or a plurality of VTRID, and a VTR control command (combination of CMDO and CMD1 shown in FIGS. 5 and 6) corresponding to each VTRID on one-to-one basis. Therefore, the number of words in UDW is not fixed but varies depending on the number of VTRID. Accordingly, the value of DC is also not fixed but varies depending on an individual "VTR control packet".

VTRID is information to designate a VTR to be controlled among respective VTRs 2 in FIG. 2. A unique identification code such as 01h, 02h, 03h, and 04h has given to VTRs 2 respectively, and when a VTR 2 is individually designated to be controlled, the identification code given to that VTR is set as VTRID. In addition, when all the VTRs 2 are designated to be controlled, 00h is designated as VTRID.

FIGS. 9 and 10 are tables in which a structure of a "VTR control packet" generated by the SDI encoder 13 as an independent ANC packet is shown as an example corresponding to FIG. 7. Among those figures, FIG. 9 is an example in which 00h is set as VTRID (all of the VTRs 2 are designated). On the other hand, FIG. 10 is an example in which 01h and 03h are respectively designated as VTRID (two of VTRs 2 are individually designated).

As shown in FIG. 3, a digital signal to which a format conversion is performed and an ANC packet is multiplexed by the SDI encoder 13 is converted into a signal of a serial system by a parallel/serial conversion circuit 16. Further, as shown in FIG. 2, an output signal (HD-SDI signal) of the parallel/serial conversion circuit 16 is transmitted from the HD-SDI output terminal 1a of the video camera 1 to each VTR 2 through the distributor 3, respectively.

Figure 11:
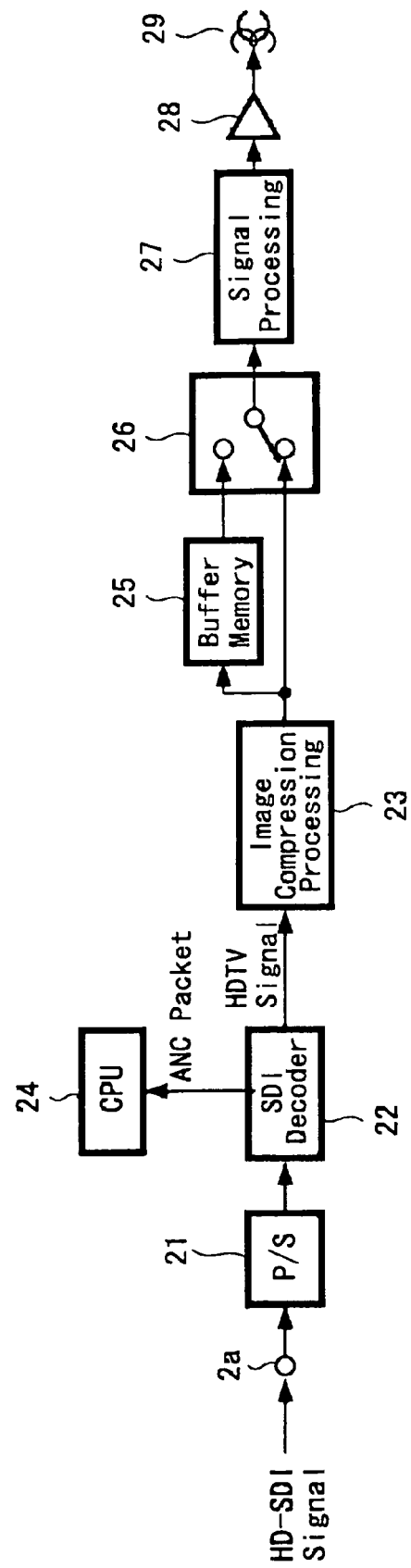
FIG. 11 is a block diagram showing a configuration of a recording system of each VTR in FIG. 2.

FIG. 11 is a block diagram showing a configuration of a recording system of each VTR 2. The HD-SDI signal input into the HD serial digital input terminal 2a (FIG. 2) is converted into a signal of a parallel system by a serial/parallel conversion circuit 21 and is sent to a SDI decoder 22.

The SDI decoder 22 is a processor to separate a digital HDTV signal, a digital audio signal, and an ANC packet from the HD-SDI signal. The digital HDTV signal separated by the SDI decoder 22 is sent to an image compression processing circuit 23 in which a bit rate is compressed. A video data compressed in the image compression processing circuit 23 is sent to a buffer memory 25 and also is sent to one of input terminals in a switch 26 having two inputs and one output.

The buffer memory 25 has a capacity capable of storing the compressed video data for a period of approximately one to two minutes (time approximately required for replacing a video cassette described later on). The video data read out from the buffer memory 25 is sent to the other input terminal in the switch 26.

The video data output from the output terminal of the switch 26 is sent to a recording head 29 through a recording amplifier 28 after processing of error correction coding and record coding is performed in a signal processing circuit 27, and is recorded on a video tape (not illustrated).

In addition, although not illustrated in the figure, the digital audio signal separated by the SDI decoder 22 is also sent to the recording head 29 and is recorded on the video tape.

Figure 12:
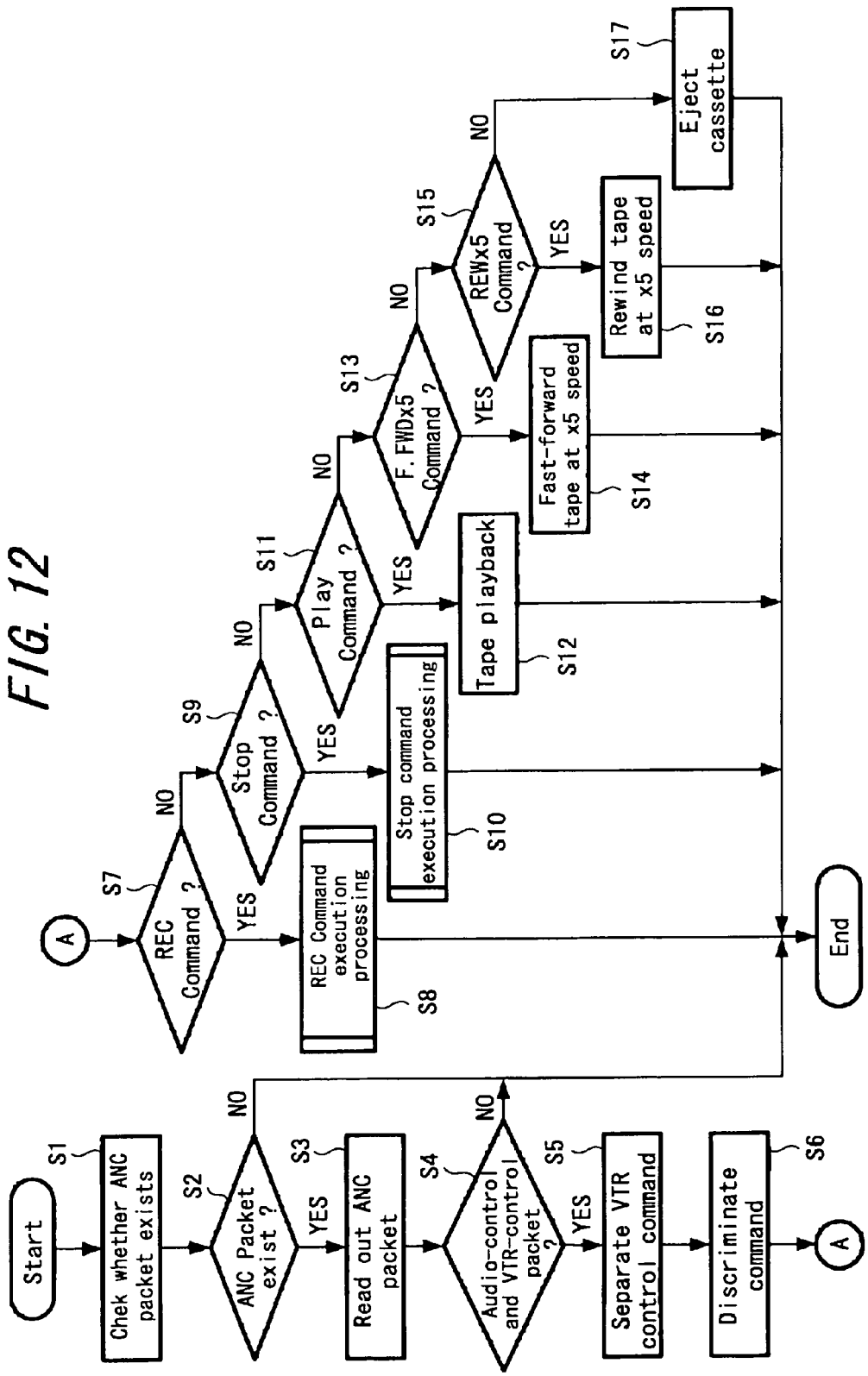
FIG. 12 is a flow chart showing contents of processing executed by a CPU in FIG. 11 based on a VTR control command.

On the other hand, the ANC packet separated by the SDI decoder 22 is sent to a CPU 24 that controls each unit of the VTR 2. FIG. 12 is a flow chart showing contents of processing executed by the CPU 24 based on the VTR control command (FIGS. 6 and 7) contained in the ANC packet.

The processing is executed at intervals of one field of the digital HDTV signal, and first, whether there is an ANC packet sent from the SDI decoder 22 is checked (step S1) to judge whether the ANC packet is sent or not (step S2).

If the judgment is NO, the processing is ended. On the other hand, if the judgment is YES, the ANC packet sent is read out (step S3). Further, whether the ANC packet is an "audio-control and VTR-control packet" (FIG. 7) is judged based on the data ID and secondary data ID of the ANC packet (step S4).

If the judgment is NO, the processing is ended. On the other hand, if the judgment is YES, a VTR control command (CMDO and CMD1 in FIG. 7) is separated from the "audio-control and VTR-control packet" (step S5), and contents of the VTR control command (FIG. 6) is discriminated (step S6).

Further, whether the VTR control command is the REC command (FIG. 6) is judged (step S7). If the judgment is YES, "REC command execution processing" as described later on is executed (step S8), and the processing is ended after that.

If the judgment is NO in step S7, whether the VTR control command is the STOP command (FIG. 6) is judged (step S9). If the judgment is YES, "STOP command execution processing" as described later on is executed (step S10), and the processing is ended thereafter.

If the judgment is NO in step S9, whether the VTR control command is the PLAY command (FIG. 6) is judged (step S11). If the judgment is YES, a reproduction system (not illustrated) of the VTR 2 is controlled to play the video tape (step S12), and the processing is ended thereafter.

If the judgment is NO in step S11, whether the VTR control command is the F. FWD×5 command (FIG. 6) is judged (step S13). If the judgment is YES, the reproduction system of the VTR 2 is controlled to fast-forward the video tape at ×5 speed (step S14), and the processing is ended thereafter.

If the judgment is NO in step S13, whether the VTR control command is the REW×5 command (FIG. 6) is judged (step S15). If the judgment is YES, the reproduction system of the VTR 2 is controlled to make the video tape rewound at ×5 speed (step S16), and the processing is ended thereafter.

If the judgment is also NO in step S15, since the VTR control command is the EJECT command, a loading mechanism (not illustrated) of the VTR 2 is controlled to make the video cassette ejected (step S17) and the processing is ended thereafter.

Figure 13:
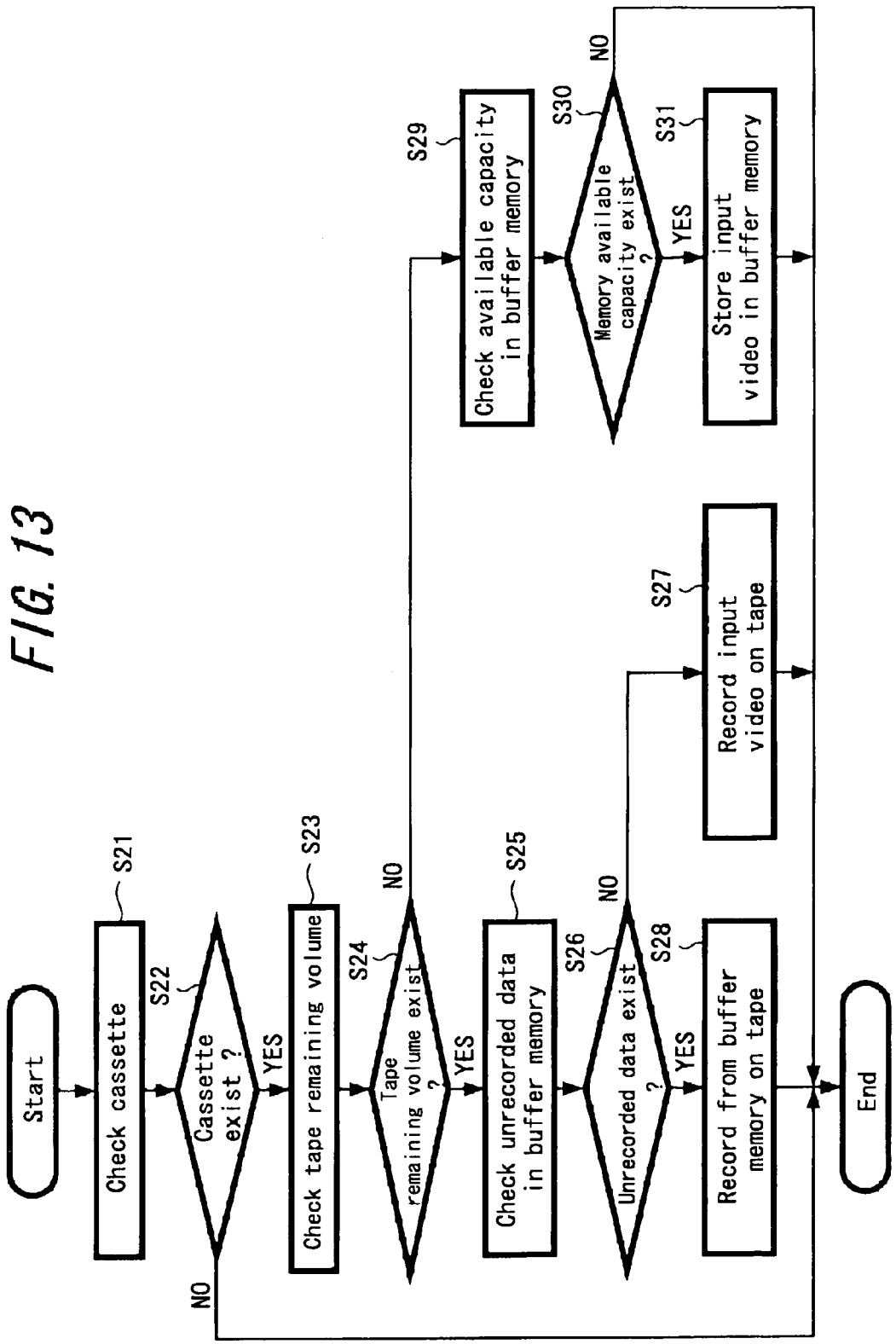
FIG. 13 is a flow chart showing contents of "REC command execution processing" in FIG. 12.

FIG. 13 is a flow chart showing contents of the "REC command execution processing" shown as step S8 in FIG. 12.

First, whether there is a video cassette loaded in the VTR 2 is checked (step S21) to judge whether the video cassette has been loaded (step S22).

If the judgment is NO, the "REC command execution processing" is ended. On the other hand, if the judgment is YES, a remaining volume of the video tape (volume of an unrecorded portion) in the video cassette is checked (step S23) to judge whether there is a remaining volume (step S24).

If the judgment is YES, whether there is video data stored in the buffer memory 25 (FIG. 11) but not yet recorded in the video tape is checked (note that, in case that the rewinding of the video tape is performed based on the REW×5 command in steps S15 and S16 in FIG. 12 after the video data is stored in the buffer memory 25, video data in the buffer memory 25 is not handled as such unrecorded data) (step S25). Further, whether such data unrecorded in the video tape exists or not in the buffer memory 25 is judged (step S26).

If the judgment is NO, with the switch 26 (FIG. 11) being switched to the side of the image compression processing circuit 23, video data that is input into the VTR 2 and is being compressed presently in the image compression processing circuit 23 is recorded on the video tape (step S27). Then, the "REC command execution processing" is ended.

On the other hand, if the judgment is YES in step S26 and the unrecorded data is read out from the buffer memory 25 by FIFO system and further the switch 26 is switched to the side of the buffer memory 25, the unrecorded data is recorded on the video tape (step S28). Then, the "REC command execution processing" is ended.

In the case where the judgment is NO in step S24, available capacity in the buffer memory 25 is checked (here, after having read out the video data in step S28, a memory area where video data has already been stored is also handled as an area capable of being overwritten) (step S29). Then, whether there is the available capacity is judged (step S30).

If the judgment is YES, the video data sent from the image compression processing circuit 23 to the buffer memory 25 is stored in the buffer memory 25 (step S31). Then, the "REC command execution processing is ended. On the other hand, if the judgment is NO in step S30, the "REC command execution processing" is ended without executing any processing.

Figure 14:
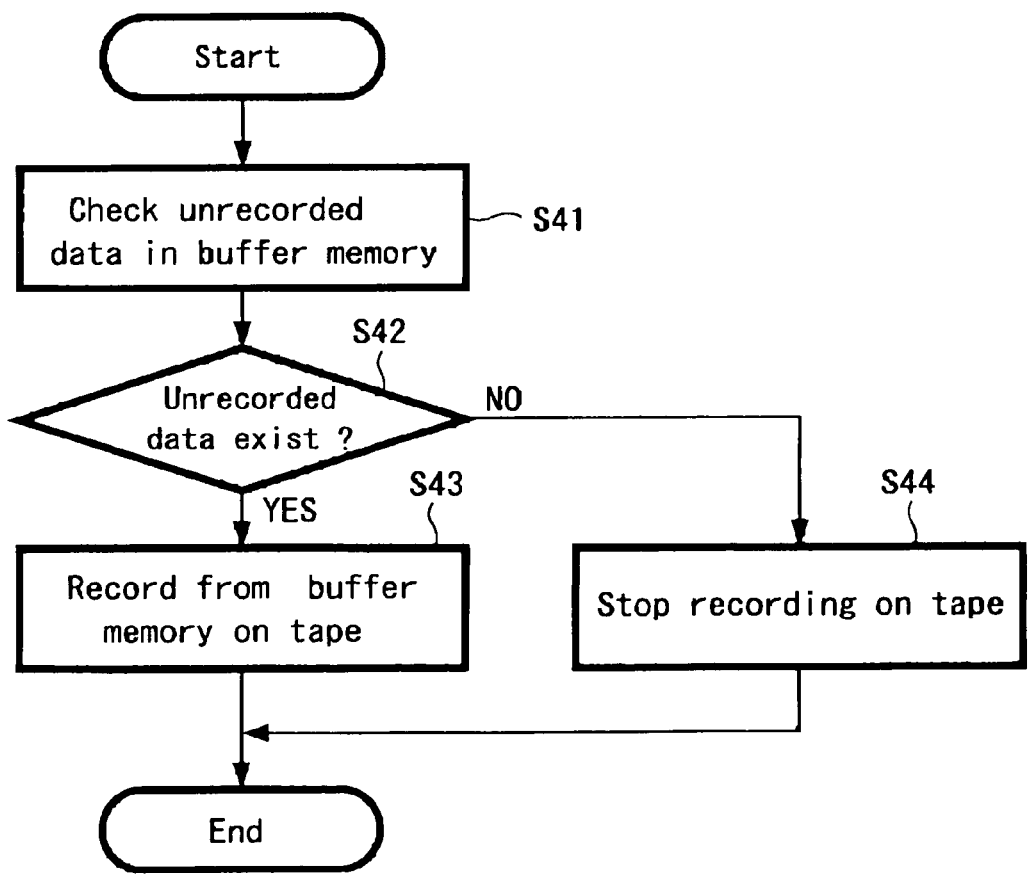
FIG. 14 is a flow chart showing contents of "STOP command execution processing" in FIG. 11.

FIG. 14 is a flow chart showing contents of the "STOP command execution processing" shown as step S10 in FIG. 12. First, in the case where video data has been recorded in the buffer memory 25 (FIG. 11), after the recording of the video data in the buffer memory 25 is terminated, whether there is video data stored in the buffer memory 25 but not yet recorded on the video tape is checked (step S41). Further, whether such data as unrecorded on the video tape exists in the buffer memory 25 or not is judged (step S42).

If the judgment is YES, the unrecorded data is read out from the buffer memory 25 by the FIFO system and the switch 26 is switched to the side of the buffer memory 25, and the unrecorded data is recorded on the video tape (step S43). Then, the "STOP command execution processing" is ended.

On the other hand, if the judgment is NO in step S42, the recording of the video data on the video tape is stopped (step S44). Then, the "STOP command execution processing" is ended.

Note that the processing shown in FIG. 12 is the processing in the case that the SDI encoder 13 (FIG. 3) of the video camera 1 generates the "audio-control and VTR-control packet" (FIG. 7). On the other hand, in the case where the SDI encoder 13 generates the "VTR control packet" that is the independent ANC packet as shown in FIGS. 9 and 10, the processing may be changed such that the VTR control command is executed only when the relevant VTR 2 is designated with VTRID in UDW of the "VTR control packet".

Figure 15:
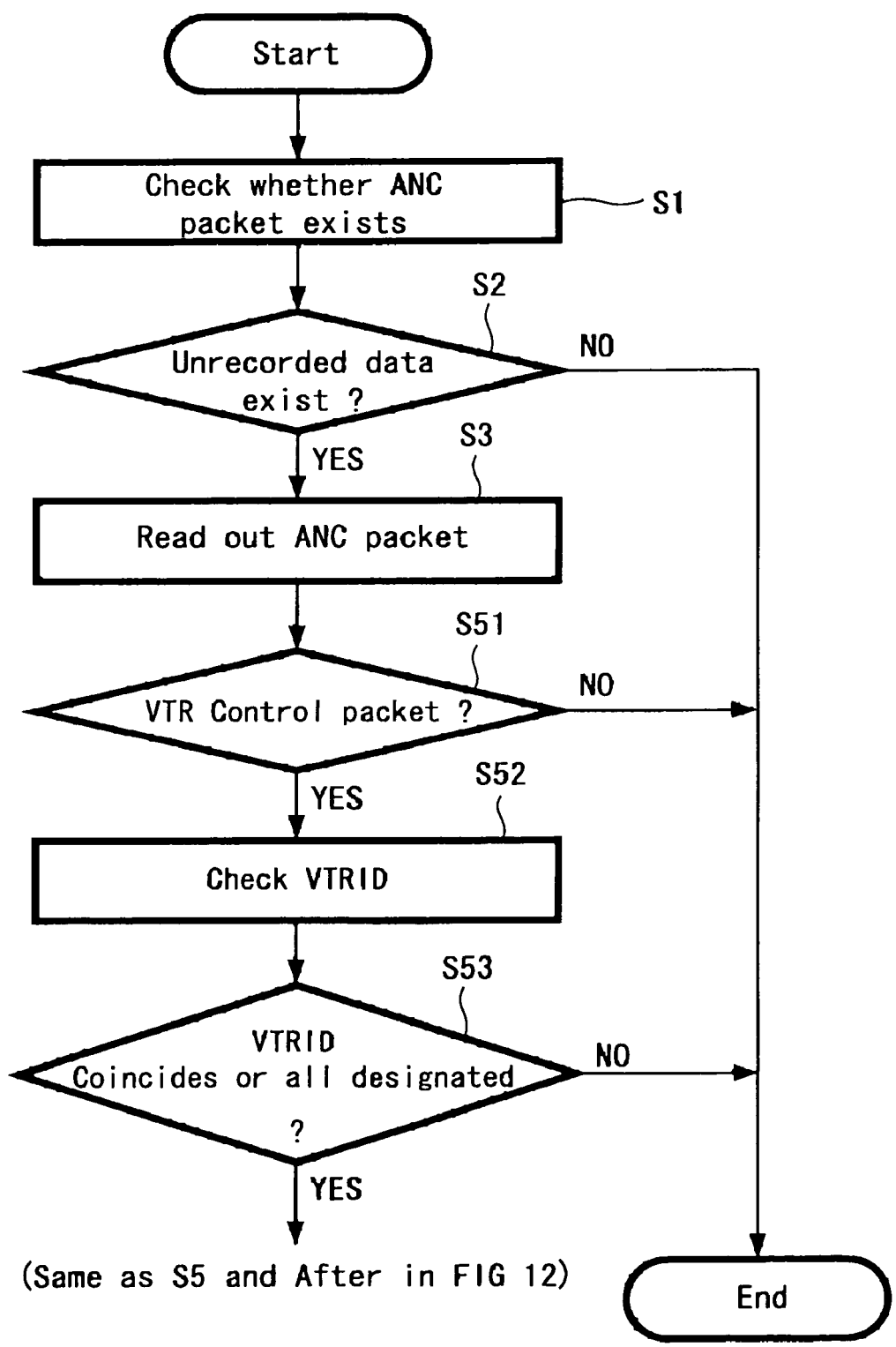
FIG. 15 is a flow chart showing a changed portion in the processing of FIG. 12 in the case where an independent "VTR-control packet" is generated.

FIG. 15 is a chart showing processing changed in this case, and steps S1 through S3 are the same processing as steps S1 through S3 in FIG. 12. In this case, subsequently to step S3, whether the ANC packet is the "VTR control packet" (FIGS. 9 and 10) is judged based on the data ID and secondary data ID of the ANC packet (step S51).

If the judgment is NO, the processing is ended. On the other hand, if the judgment is YES, VTRID in UDW of the "VTR control packet" is checked (step S52) to judge whether such conditions as 'VTRID coincides with the identification code supplied to the relevant VTR 2 or designates all the VTRs 2 (VTRID=00*h*)' are satisfied (step S53).

If the judgment is NO, the processing is ended. On the other hand, if the judgment is YES, the same processing as step S5 and after that in FIG. 12 is executed.

Next, in the system for pool coverage explained above, the aspect of the video obtained with the video camera of the managing station is recorded in each VTR of the other broadcasting stations is described.

When the camera operator of the managing station starts recording with the video camera 1 (FIG. 2) by operating the REC button 15*a* of the operation unit 15 (FIG. 3), the "audio-control and VTR-control packet" (FIG. 7) including the REC command (FIG. 6) is generated and multiplexed by the SDI encoder 13 (FIG. 3) at intervals of one field, and the HD-SDI signal in which the "audio-control and VTR-control packet" is multiplexed is transmitted from the video camera 1 to each VTR 2 (FIG. 2) of the other broadcasting stations through the HD-SDI distributor 3 (FIG. 2).

In each VTR 2, the "audio-control and VTR-control packet" is separated by the SDI decoder 22 (FIG. 11) at intervals of one field, and the "REC command execution processing" (steps S1 through S8 in FIG. 12, and FIG. 13) based on the REC command in the "audio-control and VTR-control packet" is executed by the CPU 24 (FIG. 11).

Further, in the case where there is the remaining volume in the video tape, the video data that is input in the VTR 2 and that is presently compressed in the image compression processing circuit 23 (FIG. 11) is recorded on the video tape (steps S21 through S27 in FIG. 12).

On the other hand, in the case where there is no remaining volume of the video tape (specifically, when it is necessary to replace the video cassette), the video data being compressed in the image compression processing circuit 23 starts to be recorded in the buffer memory 25 (steps S21 through S24 and S29 through S31 in FIG. 13).

Further, when replacing the video cassette has been completed, the video data stored in the buffer memory 25 until then is recorded on the newly replaced video tape (steps S21 through S26, and S28 in FIG. 13). Hence, the video that has been obtained with the video camera 1 during the replacement of the video cassette is to be recorded in the VTR 2 with a time difference only by the replacing work.

Thereafter, when the camera operator of the managing station ends the recording with the video camera 1 by operating the STOP button 15*b* (FIG. 3) of the operation unit 15, the "audio-control and VTR-control packet" (FIG. 7) including the STOP command (FIG. 6) is generated and multiplexed by the SDI encoder 13 (FIG. 3) at intervals of one field, and the HD-SDI signal in which the "audio-control and VTR-control packet" is multiplexed is transmitted from the video camera 1 to each VTR 2 through the HD-SDI distributor 3.

In each VTR 2, the "audio-control and VTR-control packet" is separated by the SDI decoder 22 at intervals of one field, and the "STOP command execution processing" (steps S1 through S7, S9, S10 in FIG. 12, and FIG. 14) based on the STOP command in the "audio-control and VTR-control packet" is executed by the CPU 24.

Further, in the case where recording with the time difference (steps S21 through S26, and S28 in FIG. 13) has not been performed in the "REC command execution processing" executed until then (specifically, in the case where the video cassette is not replaced, because there is a remaining volume of the tape), the recording to the video tape is immediately stopped (steps S41, S42, and S44 in FIG. 14).

On the other hand, in the case where the recording with time difference (steps S21 through S26, and S28 in FIG. 13) is performed in the "REC command execution processing" that has been executed until then (in other words, in the case where the video cassette has been replaced), all video data not yet recorded on the video tape among the video data stored in the buffer memory 25 are recorded on the video tape (steps S41 through S43 in FIG. 14), and the recording on the video tape is stopped after that (steps S41, S42, and S44 in FIG. 14).

Note that there is no such case that video not recorded in the video camera 1 is recorded in the VTR 2, because the recording of video data in the buffer memory 25 is stopped first in the "STOP command execution processing" (step S41 in FIG. 14) when the recording with the video camera 1 is ended even after the recording of video data in the buffer memory 25 is started in the "REC command execution processing".

Thus, in this system, the command to control each VTR 2 to perform the same operation as the recording/recording stop operation of the video camera 1 is supplied to each VTR 2 at intervals of one field (in other word, constantly) as the ANC packet multiplexed with the HD-SDI signal transmitted from the video camera 1 to each VTR 2.

Figure 1:
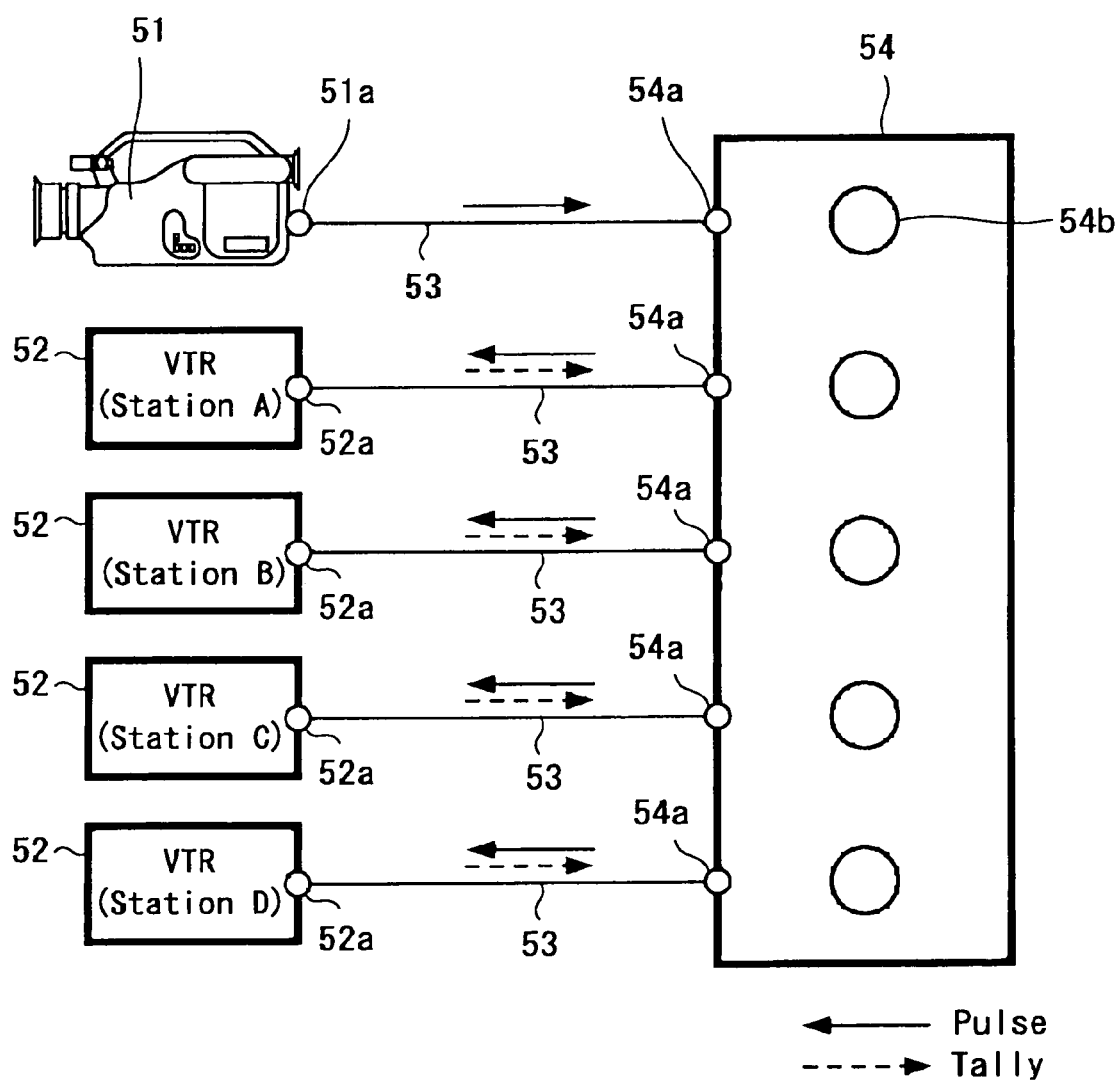
FIG. 1 is a diagram showing a configuration of a system for pool coverage in related art.

Therefore, since reliability of the command supplied from the video camera 1 of the managing station to each VTR 2 of the other broadcasting stations (station A through station D) can be improved, each VTR 2 can record the same video as recorded by the video camera 1 unless there is a situation attributed to the responsibility on the side of the other broadcasting stations such as inadequate settings and malfunction of the VTR 2. Accordingly, with respect to the system of pool coverage in related art shown in FIG. 1, the problem (a) which is described in the section of "SUMMARY OF THE INVENTION" can be solved, and work on the side of managing station in the pool coverage can be reduced.

Further, in the case where no volume remains in the video tape on the side of VTR 2 while recording video obtained with the video camera 1 in the VTR 2, the video can be recorded in the VTR 2 without interruption, because the video obtained thereafter with the video camera 1 is recorded with time difference on a newly replaced video tape.

In addition, since a BNC cable has 100 meters to be extended and each VTR 2 can be set at a position away from the video camera 1 as described above, the above-described problem (b) can also be solved.

Furthermore, in this system, when the camera operator of the managing station noticed that video not to be recorded was recorded after starting the recording with the video camera 1, and when the video tape is rewound in the VTR unit 17 (FIG. 3) of the video camera 1 by operating the REW×5 button 15e (FIG. 3) of the operation unit 15 in order to overwrite and erase the video, the "audio-control and VTR-control packet" (FIG. 7) including the REW×5 command (FIG. 6) is generated and multiplexed by the SDI encoder 13 (FIG. 3) at intervals of one field, and the HD-SDI signal in which "audio-control and VTR-control packet" is multiplexed is transmitted from the video camera 1 to each VTR 2 (FIG. 2) of the other broadcasting stations through the HD-SDI distributor 3 (FIG. 2).

In each VTR 2, the "audio-control and VTR-control packet" is separated at intervals of one field by the SDI decoder 22 (FIG. 11), and the video tape is rewound based on the REW×5 command in the "audio-control and VTR-control packet" (steps S1 through S7, S9, S11, S13, S15, and S16 in FIG. 12).

Therefore, in the case where the video already recorded in the video camera 1 is overwritten and erased, the same video that is recorded in each VTR 2 can be overwritten and erased.

Furthermore, in this system, when the camera operator of the managing station operates the PLAY button 15c, F. FWD×5 button 15d, and EJECT button 15f (FIG. 3) of the operation unit 15 to perform play and fast-forward of a video tape, and ejection of a video cassette in the VTR unit 17 (FIG. 3) of the video camera 1, the "audio-control and VTR-control packet" (FIG. 7) including the PLAY command, F. FWD×5 command, and EJECT command (FIG. 6) is generated and multiplexed by the SDI encoder 13 (FIG. 3) at intervals of one field, and the HD-SDI signal in which the "audio-control and VTR-control packet" is multiplexed is transmitted from the video camera 1 to each VTR 2 (FIG. 2) of the other broadcasting stations through the HD-SDI distributor 3 (FIG. 2).

In each VTR 2, the "audio-control and VTR-control packet" is separated by the SDI decoder 22 (FIG. 11) at intervals of one field, and the play of the video tape (steps S1 through S7, S9, S11, and S12 in FIG. 12), fast-forward of the video tape (steps S1 through S7, S9, S11, S13, and S14 in FIG. 12), and ejection of the video cassette (steps S1 through S7, S9, S11, S13, S15, and S17 in FIG. 12) are performed based on the PLAY command, F. FWD×5 command, and EJECT command in the "audio-control and VTR-control packet".

Therefore, when the play of the video tape, fast-forward of the video tape, and ejection of the video cassette are performed in the video camera 1, the same operation can also be performed in each VTR 2.

Furthermore, in the case where the SDI encoder 13 of the video camera 1 generates the "VTR control packet" (FIGS. 9 and 10) as an independent packet, each VTR 2 checks VTRID in UDW of the "VTR control packet", and the VTR control command is executed only when the VTRID coincides with the identification code supplied to the relevant VTR 2 or all the VTRs 2 are designated (FIG. 15).

Therefore, in the case where video needs to be recorded only in VTRs 2 of a part of broadcasting stations among the other broadcasting stations than the managing station, only the VTRs 2 of a part of the broadcasting stations can be designated and comtrolled.

It should be noted that the audio signal from the microphone attached to the video camera 1 is transmitted to each VTR 2 as the HD-SDI signal in the system configuration shown in FIG. 2. However, in the case where pool coverage is performed, for example, in a baseball stadium, there is a case in which it is desired to record audio in each VTR 2 using a separate microphone at the time of player-of-the-game interview and the like. In that case, as shown in FIG. 16, analog audio signals from separate microphones 31 and 32 are mixed in a mixer 33 and are converted into a serial digital audio signal of AES/EBU format in an A/D converter 34 to be input into a multiplexer (device to multiplex a serial digital audio signal of AES/EBU format with a HD-SDI signal) 35, and the HD-SDI signal from the video camera 1 is also input into the multiplexer 35, and so the HD-SDI signal in which the serial digital audio signal is multiplexed in the multiplexer 35 is input into the HD-SDI distributor 3.

Further, in the system configuration shown in FIG. 2, the HD-SDI signal is transmitted from the video camera 1 to each VTR 2 through the HD-SDI distributor 3. However, as another embodiment, each VTR 2 may be connected to the video camera 1 in a daisy-chain system, and the HD-SDI signal can be transmitted from the video camera 1 to each VTR 2 without using the HD-SDI distributor 3.

In addition, although the "audio-control and VTR-control packet" in the above-described embodiment is generated and multiplexed at intervals of one field on the side of video camera 1, the "audio-control and VTR-control packet" can be generated and multiplexed at intervals of one frame, or can be generated and multiplexed at intervals of three fields or more, as another embodiment. In that case also, since the VTR control command is regularly supplied to each VTR 2 as the ANC packet multiplexed with the HD-SDI signal transmitted from the video camera 1 to each VTR 2, the reliability of the command supplied from the video camera 1 to each VTR 2 can be enhanced.

Moreover, in the above-described embodiment, the HD-SDI signal is transmitted from the video camera 1 to each VTR 2 and the VTR control command is set in the ANC packet in which the HD-SDI signal is multiplexed. However, as another embodiment, it is also possible to transmit a SD-SDI signal, a SDDI (Serial Digital Data Interface) signal, or a SDTI (Serial Date Transport Interface) signal from the video camera 1 to each VTR 2 and to set the VTR control command in an ANC packet multiplexed with that signal. Generally speaking, control information to control the VTR 2 in accordance with an operational status of the operation unit 15 of the video camera 1 is regularly generated, the control information and a video signal obtained with the video camera 1 are multiplexed to generate a serial digital signal of an appropriate format, and the serial digital signal is transmitted to each VTR 2.

Further, in the above-described embodiment, the present invention is applied to the system that includes the VTR-incorporated video camera and the VTR. However, not limited thereto, the present invention may be applied to a system using a video camera and a video recording apparatus in which video is recorded in other recording media (for example, in an optical disk) than a video tape.

Furthermore, in the above-described embodiment, the present invention is applied to pool coverage, however, not limited thereto, the present invention may be applied to backup recording (video recorded with a video camera is also recorded in a separate VTR for backup), and to remote recording (video obtained with a video camera is recorded in a VTR located at a distant place). Speaking more generally, the present invention may be applied to all cases where video obtained with a video camera is recorded in another video recording apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A video recording system comprising:
a video camera that performs pool coverage; and
at least one video recording apparatus,
wherein said video camera includes:
control information generation means for generating control information to control said video recording apparatus at predetermined intervals in accordance with an operational status of an operation unit of said video camera; and
transmission data generation means for generating a transmission serial digital signal by multiplexing said control information and a video signal from an imaging unit of said video camera, and transmitting said serial digital signal to said video recording apparatus; and wherein said video recording apparatus includes:
separation means for separating said video signal and said control information from said serial digital signal, and
control means for controlling a video recording system of said video recording apparatus based on said control information,
wherein the control information includes identification information identifying the at least one video recording apparatus, and
wherein when the control information includes a first set of information, the control information makes the at least one video recording apparatus fastforward at a predetermined speed,
wherein when the control information includes a second set of information, the control information makes the at least one video recording apparatus rewind at the predetermined speed, and
wherein the control information indicates the operational status of the operation unit of the video camera,
wherein the control information has a format consistent with an ancillary data space of HD-SDI, and
wherein the video camera has a terminal for connecting a BNC cable, and the at least one video recording apparatus has a terminal for connecting a BNC cable.

2. A video recording system according to claim 1, wherein said control information generation means of said video camera generate said control information at intervals of either one field or one frame of said video signal.

3. A video recording system according to claim 1, wherein said control information generation means of said video camera generate:
control information to record said video signal in said video recording system of said video recording apparatus in accordance with an operation performed to record said video signal in a video recording system attached to said video camera, and
control information to stop the recording of said video signal in said video recording system of said video recording apparatus in accordance with an operation performed to stop the recording of said video signal in the video recording system attached to said video camera.

4. A video recording system according to claim 1, wherein said control information generation means of said video camera generate:
control information to track back a position where video has already been recorded in a recording medium loaded in said video recording system of said video recording apparatus in accordance with an operation performed to track back the position where the video has already been recorded in the recording medium loaded in the video recording system attached to said video camera.

5. A video recording system according to claim 1, wherein said control information generation means of said video camera further generate identification information to designate any of said video recording apparatuses, said transmission data generation means of said video camera multiplex said identification information with said control information, and said control means of each of said video recording apparatuses control said video recording system based on said control information, only in the case where the relevant video recording apparatus is designated according to said identification information separated along with said control information by said separation means.

6. A video recording system according to claim 1, wherein said video recording apparatus further includes memory means for storing the video signal, and said control means of said video recording apparatus store said video signal in said memory means, in the case where the control information to record said video signal in said video recording system is separated by said separation means and no unrecorded area remains in a recording medium loaded in said video recording system, and after that, record said video signal, which is stored in said memory means, in the loaded recording medium, in the case where a recording medium having an unrecorded area is loaded in said video recording system.

7. A video recording system according to claim 1, wherein said transmission data generation means of said video camera generate an SDI signal and set said control information in an ancillary data packet.

8. A video camera comprising:
control information generation means for generating control information during pool coverage performed by the video camera to control one or more video recording apparatuses at predetermined intervals in accordance with an operational status of an operation unit; and
transmission data generation means for generating a transmission serial digital signal by multiplexing said control information and a video signal from an imaging unit, and outputting said serial digital signal,
wherein the control information includes identification information identifying the at least one video recording apparatus, and
wherein when the control information includes a first set of information, the control information makes the one or more video recording apparatus fastforward at a predetermined speed,
wherein when the control information includes a second set of information, the control information makes the one or more video recording apparatus rewind at the predetermined speed, and
wherein the control information indicates the operational status of the operation unit of the video camera,
wherein the control information has a format consistent with an ancillary data space of HD-SDI, and
wherein the video camera has a terminal for connecting a BNC cable, and the one or more video recording apparatus has a terminal for connecting a BNC cable.

9. A video camera according to claim 8, wherein said control information generation means generate said control information at intervals of either one field or one frame of said video signal.

10. A video camera according to claim 8, wherein said control information generation means generate control information to record said video signal in a video recording system of said video recording apparatus in accordance with an operation performed to record said video signal in the video recording system attached to said video camera, and control information to stop the recording of said video signal in said video recording system of said video recording apparatus in accordance with an operation performed to stop the recording of said video signal in the video recording system attached to said video camera.

11. A video camera according to claim 8, wherein said control information generation means generate control information to track back a position where video has already been recorded in a recording medium loaded in the video recording system of said video recording apparatus in accordance with an operation performed to track back the position where the video has already been recorded in a recording medium loaded in the video recording system attached to said video camera.

12. A video camera according to claim 8, wherein said control information generation means further generate identification information to designate any of said video recording apparatuses, and said transmission data generation means multiplex said identification information with said control information.

13. A video recording apparatus comprising:
separation means for separating a video signal and control information from an input serial digital signal;
control means for controlling a video recording system based on said control information; and
memory means for storing said video signal,
wherein said control means store said video signal in said memory means, in the case where the control information to record said video signal in said video recording system is separated by said separation means and no unrecorded area remains in a recording medium loaded in said video recording system, and after that, record said video signal, which is stored in said memory means, in the loaded recording medium, in the case where a recording medium having an unrecorded area is loaded in said video recording system,
wherein the control information includes identification information identifying the at least one video recording apparatus, and
wherein when the control information includes a first set of information, the control information makes the video recording system fastforward at a predetermined speed,
wherein when the control information includes a second set of information, the control information makes the video recording system rewind at the predetermined speed, and
wherein the control information indicates an operational status of an operation unit of a video camera that has an imaging unit and that performs pool coverage,
wherein the control information has a format consistent with an ancillary data space of HD-SDI, and
wherein the video camera has a terminal for connecting a BNC cable, and the video recording apparatus has a terminal for connecting a BNC cable.

14. A method of controlling a video recording apparatus by a video camera, comprising the steps of:
generating control information to control one or more video recording apparatuses at predetermined intervals in accordance with an operational status of an operation unit of the video camera that performs pool coverage;
generating a transmission serial digital signal by multiplexing said control information and a video signal from an imaging unit of said video camera; and
transmitting said serial digital signal to said video recording apparatus,
wherein the control information includes identification information identifying the at least one video recording apparatus, and
wherein when the control information includes a first set of information, the control information makes the video recording apparatus fastforward at a predetermined speed, wherein when the control information includes a second set of information, the control information makes the video recording apparatus rewind at the predetermined speed, and wherein the control information indicates the operational status of the operation unit of the video camera, wherein the control information has a format consistent with an ancillary data space of HD-SDI, and wherein the video camera has a terminal for connecting a BNC cable, and the at least one video recording apparatus has a terminal for connecting a BNC cable.

15. A method of controlling a video recording apparatus by a video camera according to claim 14, wherein said control information is generated at said predetermined intervals that are intervals of either one field or one frame of said video signal.

16. A method of recording a video signal in a video recording apparatus, comprising:

a first step of separating a video signal and control information from an input serial digital signal; and a second step of controlling a video recording system based on said control information, wherein, in said second step, said video signal is stored in another memory means, in the case where the control information to record said video signal in said video recording system is separated in said first step and no unrecorded area remains in a recording medium loaded in said video recording system, and after that, said video signal stored in said memory means is recorded in a loaded recording medium, in the case where a recording medium having an unrecorded area is loaded in said video recording system, wherein the control information includes identification information identifying the at least one video recording apparatus, and wherein when the control information includes a first set of information, the control information makes the video recording apparatus fastforward at a predetermined speed, wherein when the control information includes a second set of information, the control information makes the video recording apparatus rewind at the predetermined speed, and wherein the control information indicates an operational status of an operation unit of a video camera that has an imaging unit and that performs pool coverage, wherein the control information has a format consistent with an ancillary data space of HD-SDI, and wherein the video camera has a terminal for connecting a BNC cable, and the at least one video recording apparatus has a terminal for connecting a BNC cable.

17. A video camera comprising:

a control information generator generating control information during pool coverage performed by the video camera to control one or more video recording apparatuses at predetermined intervals in accordance with an operational status of an operation unit; and a transmission data generator generating a transmission serial digital signal by multiplexing said control information and a video signal from an imaging unit, and outputting said serial digital signal, wherein the control information includes identification information identifying the at least one video recording apparatus, and wherein when the control information includes a first set of information, the control information makes the one or more video recording apparatus fastforward at a predetermined speed, wherein when the control information includes a second set of information, the control information makes the one or more video recording apparatus rewind at the predetermined speed, and wherein the control information indicates the operational status of the operation unit of the video camera, wherein the control information has a format consistent with an ancillary data space of HD-SDI, and wherein the video camera has a terminal for connecting a BNC cable, and the one or more video recording apparatus has a terminal for connecting a BNC cable.

18. A video recording apparatus comprising:

a separator separating a video signal and control information from an input serial digital signal:

a controller controlling a video recording system based on said control information; and a memory storing said video signal, wherein said controller stores said video signal in said memory, in the case where the control information to record said video signal in said video recording system is separated by said separator and no unrecorded area remains in a recording medium loaded in said video recording system, and after that, records said video signal, which is stored in said memory, in the loaded recording medium, in the case where a recording medium having an unrecorded area is loaded in said video recording system, wherein the control information includes identification information identifying the at least one video recording apparatus, and wherein when the control information includes a first set of information, the control information makes the video recording system fastforward at a predetermined speed, wherein when the control information includes a second set of information, the control information makes the video recording system rewind at the predetermined speed, and wherein the control information indicates an operational status of an operation unit of a video camera that has an imaging unit and that performs pool coverage, wherein the control information has a format consistent with an ancillary data space of HD-SDI, and wherein the video camera has a terminal for connecting a BNC cable, and the video recording apparatus has a terminal for connecting a BNC cable.

* * * * *